Dec. 10, 1946.  C. E. TACK ET AL  2,412,431
BRAKE ARRANGEMENT
Filed Oct. 27, 1944
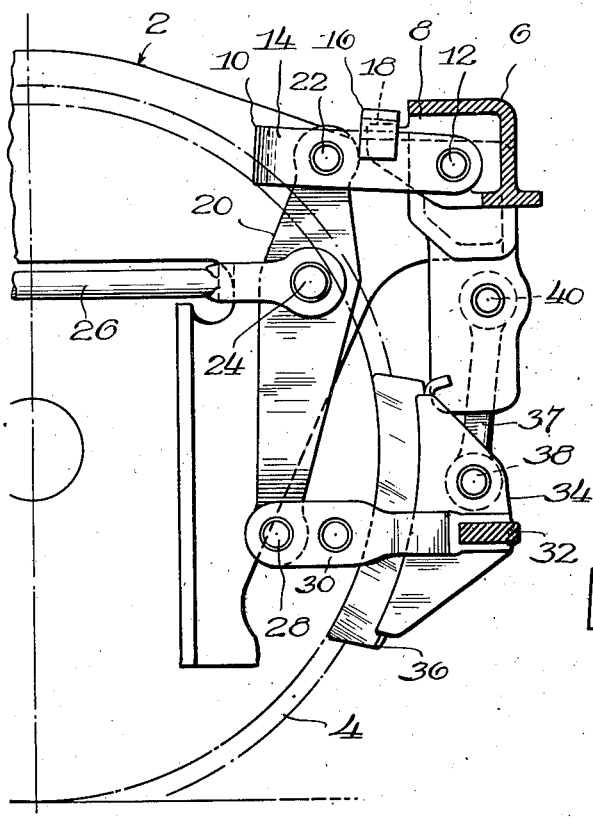
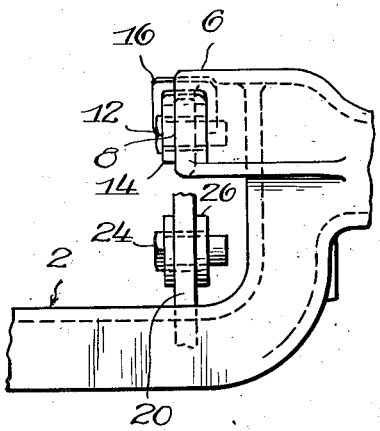
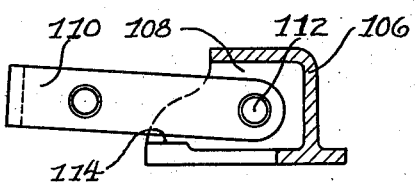
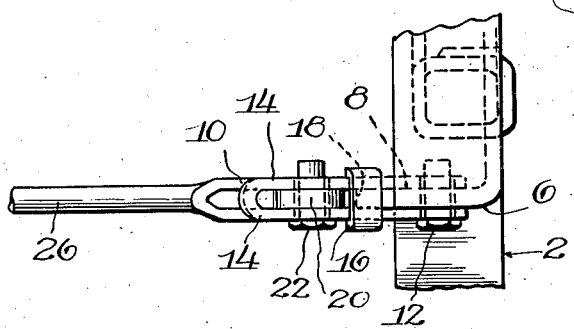
INVENTORS
Carl E. Tack
and Norman Hesch
Orin W. Garner  Atty.

Patented Dec. 10, 1946

2,412,431

UNITED STATES PATENT OFFICE 2,412,431

BRAKE ARRANGEMENT

Carl E. Tack and Norman Flesch, Chicago, Ill., assignors to American Steel Foundries, Chicago, Ill., a corporation of New Jersey Application October 27, 1944, Serial No. 560,535

7 Claims. (Cl. 188—205)

Our invention relates to railway brake equipment and more particularly to a novel suspension for a truck lever.

The primary object of our invention is to eliminate the necessity for what are known in the art as balance hangers, commonly utilized to support the brake rigging under certain conditions.

Our novel arrangement is particularly adapted to a brake rigging in which the brake heads are fixed to the brake beam as by welding. Such an arrangement necessitates the use of a swivel member or link pivoted to the truck frame and to the dead lever to permit the head to adjust itself, thereby accommodating wear in the brake shoe which engages the truck wheel. In brake arrangements of this type it has heretofore been common practice, as above noted, to utilize flexible balance hangers operable upon release of the brake apparatus to maintain the brake beam and associated heads in proper released position, thereby preventing a condition wherein the brake heads drag on the wheels.

Our invention consists in providing means on the truck frame and the dead lever link for limiting downward movement of the dead lever in its released position, thereby supporting the lever and associated beam in such position that the brake shoes may not drag on the wheels.

In the drawing:

Figure 1 is a fragmentary side view of a railway car truck embodying our invention, portions of the structure being shown in section to clarify the illustration; Figure 2 is a fragmentary top plan view of the structure shown in Figure 1; and Figure 3 is a fragmentary end elevation of the structure shown in Figure 1.

Figure 4 is a fragmentary view comparable to Figure 1 and illustrating a modification of our invention.

Describing our invention in detail and referring first to Figures 1–3, the truck frame, generally designated 2 is supported in conventional manner from a wheel 4 (Figure 1) and said frame comprises a bracket 6 including a vertical web 8 to which a fulcrum link 10 is pivoted at 12 by means of a pin or other suitable pivot means. The link 10 is of U shape, as seen in the plan view of Figure 2, and comprises spaced legs 14, 14 embracing the web 8, and a bridge member 16 is secured to the legs 14, 14 for abutment with a lug 18 integrally formed with the web 8 of the side frame upon release of the brake mechanism, as hereinafter described.

The invention is herein illustrated as applied to a dead truck lever 20 disposed at the end of the truck frame 2, the upper end of said lever extending between the legs 14, 14 of the link 10 and being pivoted thereto as at 22. Intermediate its ends the lever 20 is pivotally connected at 24 to the jaw end of a pull rod 26 which is operatively connected to any suitable actuating means (not shown), such as, for example, a live truck lever at the opposite side of the wheel.

The lower end of the lever 20 is pivotally connected at 28 to the fulcrum jaw 30 of the conventional brake beam 32 which is rigidly fixed to a brake head 34, carrying a brake shoe 36 for engagement with the periphery of the wheel 4. The beam 32 is supported by a hanger 37 pivotally connected at 38 to the brake head and pivotally connected at 40 to the truck frame. It will be understood that the beam 32, the fulcrum jaw 30, and the brake head 34 are preferably united in a conventional one-piece rigid structure. The particular construction of the brake beam is of no significance except as hereinafter described and for this reason the structure is not illustrated in detail.

It may be noted that the brake mechanism is illustrated in applied position with the brake shoe 36 engaged with the wheel 4, and it will be understood by those skilled in the art that upon release of the brake mechanism, the lever 20 will tend to move downwardly and to pivot in a counterclockwise direction about the pivot point 22, thus permitting the brake shoe to swing away from the wheel 4. This action, if unlimited, might result in the upper end of the shoe 36 dragging against the wheel 4 in the release position of the brake mechanism; however, the lug 18 of the frame is adapted to engage the bridge member 16 of the link 10 to limit this downward movement of the lever 20 so that the shoe 36 may not drag on the wheel, as above described. It will also be understood by those skilled in the art that in the event of uneven wear on the shoe 36, the pivotal connection of the link 10 to the truck frame permits adjustment of the various elements of the rigging so that the shoe 36 may bear evenly from top to bottom thereof against the wheel 4.

Referring now to Figure 4, a modification of our invention is illustrated wherein the frame bracket 106 comprises the vertical web 108 embraced by the fulcrum link 110 which is pivoted to the web 108 as at 112, said link affording a convenient fulcrum for the upper end of an associated brake lever (not shown), as in the previously-described embodiment of our invention. The lower extremity of the web 108 is provided at each side thereof with a ledge 114 for abutment with one leg of the U-shaped link 110 to limit downward movement thereof as in the previous embodiment. It will be understood that the modification of Figure 4 is identical with the embodiment illustrated in Figures 1–3 except that downward movement of the link 110 is limited by abutment of each leg thereof with the ledge 114 formed on the vertical web 108 of the frame bracket 106. For the purpose of simplicity, the other elements of the brake arrangement are eliminated in Figure 4.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a brake arrangement for a railway car truck comprising a truck frame and a supporting wheel, the combination of a brake beam, a brake head carried thereby, a brake shoe supported by said head for engagement with said wheel, hanger means pivoted to said head and said frame to afford support for said beam, a fulcrum jaw on said beam, a truck lever pivoted at its lower end to said jaw, a link comprising spaced legs embracing a portion of said frame and pivoted thereto, said lever extending at its upper end between said legs and being pivoted thereto, operating means connected to said lever, and a bridge member connected to said legs and overlying a portion of said frame for abutment therewith to limit downward movement of said lever upon release of said operating means.

2. In a brake arrangement for a railway car truck comprising a truck frame and a supporting wheel, the combination of a brake beam, a brake head rigidly fixed thereto, a brake shoe carried by said head for engagement with said wheel, hanger means pivoted to said head and said frame to afford support for said beam, a fulcrum jaw fixed to said beam, a dead truck lever pivoted at its lower end to said jaw, a link pivoted to said frame and to the upper end of said lever to afford a fulcrum therefor, operating means connected to said lever, and means fixed to said link and embracing a portion of said frame and adapted for engagement with said portion to limit downward movement of said lever upon release of said operating means.

3. In a brake arrangement for a railway car truck comprising a truck frame and a supporting wheel and axle assembly, the combination of a brake lever, brake means for said assembly operatively connected to and partially supported by said lever, a fulcrum link comprising spaced legs pivoted to the upper end of said lever and pivoted to said frame, and cooperating means on said frame and said link for limiting downward movement of the lever in the release position thereof, said last-mentioned means comprising a lug on said frame and a bridge member extending between the legs of said link and overlying said lug for abutment therewith upon extreme downward movement of the lever.

4. In a brake arrangement for a railway car truck comprising a truck frame and a supporting wheel and axle assembly, the combination of a brake lever, brake means for said assembly operatively connected to and partially supported by said lever, a fulcrum link pivoted to said lever and said frame, and means for limiting downward movement of the lever in the release position thereof, said last-mentioned means comprising cooperating abutment means disposed respectively on said link and said frame, the abutment means on said link being fixed thereto and embracing the abutment means on said frame.

5. In a brake arrangement for a vehicle including a vehicle frame and a supporting wheel, the combination of brake mechanism including a beam supported from said frame, friction means carried by said beam for engagement with the periphery of said wheel, a substantially vertical dead truck lever connected to said beam, and a link with spaced legs pivoted to said frame and said lever to afford a fulcrum therefor, and stop means on said link extending between the legs thereof and adapted for cooperation with an upwardly facing surface on said frame for maintaining said lever in normal position upon release of said mechanism.

6. In a brake arrangement for a vehicle including a vehicle frame and a supporting wheel, the combination of brake mechanism including a beam supported from said frame, friction means carried by said beam for engagement with said wheel, a lever connected to said beam for actuation thereof and a link with special legs pivoted to said frame and said lever to afford a fulcrum therefor, and cooperating stop means on said link and said frame for maintaining said lever in normal position upon release of said mechanism, the stop means on said link comprising a member fixed to said legs and extending therebetween at a point above the stop means on said frame.

7. In a brake arrangement for a railway car truck comprising a truck frame and a supporting wheel and axle assembly, the combination of a brake lever, brake means for said assembly operatively connected to and partially supported by said lever, a fulcrum link with spaced legs pivoted to said lever and said frame, and means extending between said legs and adapted for engagement with abutment means on said frame for limiting downward movement of the lever in the release position thereof.

CARL E. TACK.
NORMAN FLESCH.